(12) United States Patent
Pinsonneault et al.

(10) Patent No.: US 9,061,366 B2
(45) Date of Patent: Jun. 23, 2015

(54) WELDING SYSTEM AND METHOD HAVING CONTROLLED LINER CONTOUR AND WELDING WIRE CURVATURE

(75) Inventors: Paul David Pinsonneault, St. Joachim (CA); Tiejun Ma, Windsor (CA); Thomas Jaeger, Pointe Aux Roches (CA)

(73) Assignee: ILLINOIS TOOL WORKS INC., Glenview, IL (US)

(*) Notice: Subject to any disclaimer, the term of this patent is extended or adjusted under 35 U.S.C. 154(b) by 1641 days.

(21) Appl. No.: 12/128,570

(22) Filed: May 28, 2008

(65) Prior Publication Data

US 2008/0314876 A1    Dec. 25, 2008

Related U.S. Application Data

(60) Provisional application No. 60/945,888, filed on Jun. 22, 2007.

(51) Int. Cl.
*B23K 9/067*    (2006.01)
*B23K 9/12*    (2006.01)
*B23K 9/173*    (2006.01)

(52) U.S. Cl.
CPC ............ *B23K 9/122* (2013.01); *B23K 9/173* (2013.01)

(58) Field of Classification Search
USPC .............. 219/69.1, 70, 72, 74, 75, 130, 136, 219/137.31, 137.42, 137.44, 137.51, 137.8, 219/137.9, 137.61, 137.63; 287/103; 285/39; 74/501; 138/134, 139; 174/15
See application file for complete search history.

(56) References Cited

U.S. PATENT DOCUMENTS

| 3,142,746 | A  |   | 7/1964  | Schmerling |
|---|---|---|---|---|
| 3,155,811 | A | * | 11/1964 | Adamson et al. ........ 219/137.44 |
| 3,325,619 | A |   | 6/1967  | Tanenbaum |
| 3,596,786 | A | * | 8/1971  | Bernard et al. .......... 219/137.52 |
| 4,403,136 | A | * | 9/1983  | Colman .................... 219/137.31 |
| 4,731,518 | A | * | 3/1988  | Parmelee et al. ........ 219/137.31 |
| 4,873,419 | A | * | 10/1989 | Acheson .................... 219/125.1 |
| 4,952,769 | A | * | 8/1990  | Acheson .................... 219/76.14 |
| 6,078,023 | A | * | 6/2000  | Jones et al. .............. 219/137.63 |
| 6,200,519 | B1 |  | 3/2001  | Wimroither |
| 7,105,775 | B2 |  | 9/2006  | Giese |
| 7,148,443 | B2 |  | 12/2006 | Bong |
| 2007/0284353 | A1 | * | 12/2007 | Laymon .................. 219/137.31 |

FOREIGN PATENT DOCUMENTS

AT        503468      10/2007
DE       3304996       8/1984
(Continued)

*Primary Examiner* — Thien S Tran
(74) *Attorney, Agent, or Firm* — Fletcher Yoder P.C.

(57) ABSTRACT

A welding system, in certain embodiments, includes a torch having a neck with an arcuate portion, and a resilient jump liner disposed in the neck and extending through the arcuate portion. The resilient jump liner includes a pathway having a curvature configured to bend a welding wire passing through the pathway. The system also includes an annular support disposed about the resilient jump liner inside the neck, wherein the annular support is configured to at least substantially fix the curvature to force the welding wire to achieve a wire curvature. The system also includes a contact tip coupled to the neck, wherein the wire curvature is configured to bias the welding wire into substantially consistent contact with an interior pathway through the contact tip.

26 Claims, 6 Drawing Sheets

(56) References Cited

FOREIGN PATENT DOCUMENTS

| | | | |
|---|---|---|---|
| EP | 0042311 | 12/1981 | |
| GB | 425155 | 3/1935 | |
| JP | 61-074784 | * 4/1986 | ............... B23K 9/26 |
| JP | 61074784 | 4/1986 | |
| JP | 05096376 | 4/1993 | |
| JP | 2000153360 | 6/2000 | |
| WO | WO 2007112461 | 10/2007 | |
| WO | WO 2008018979 | 4/2008 | |

* cited by examiner

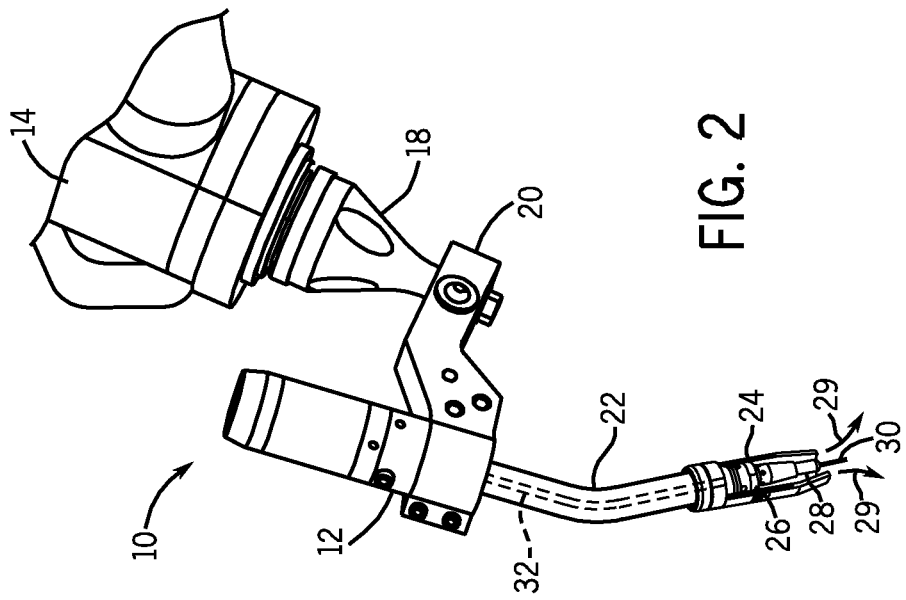
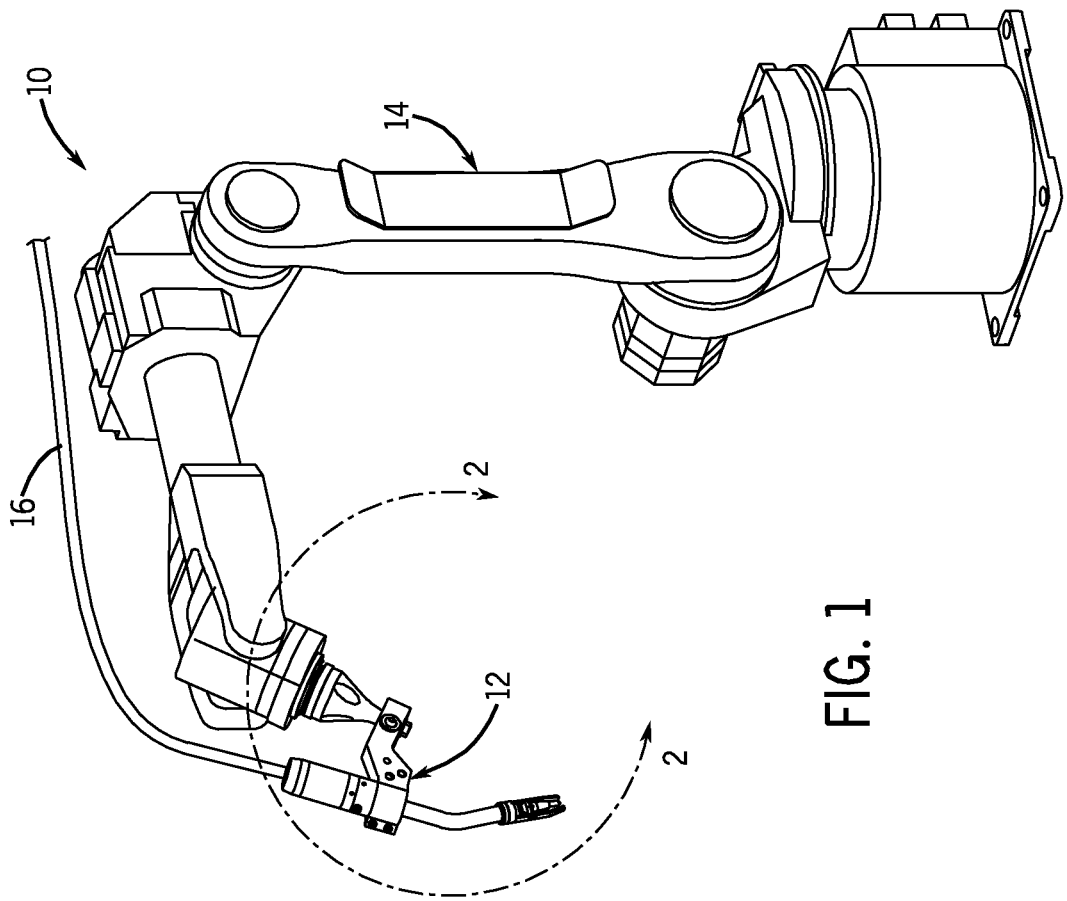

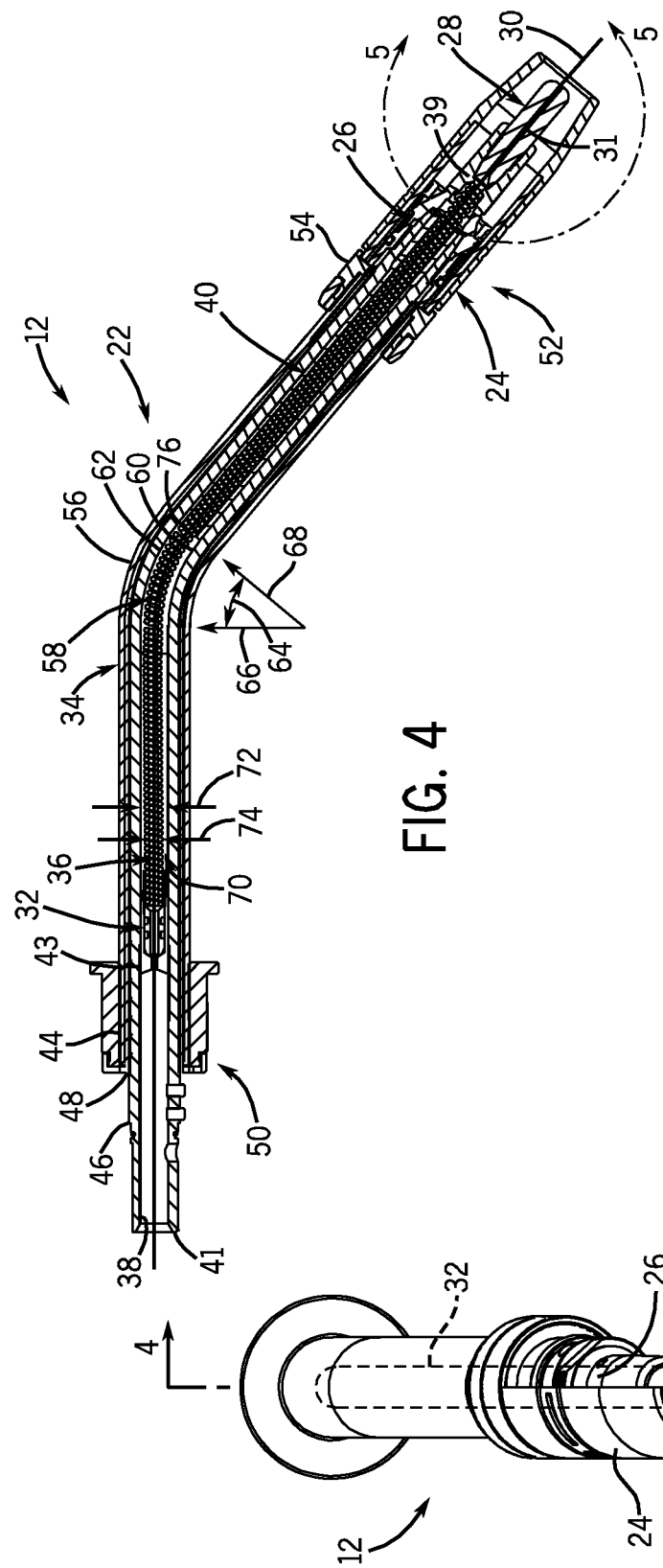
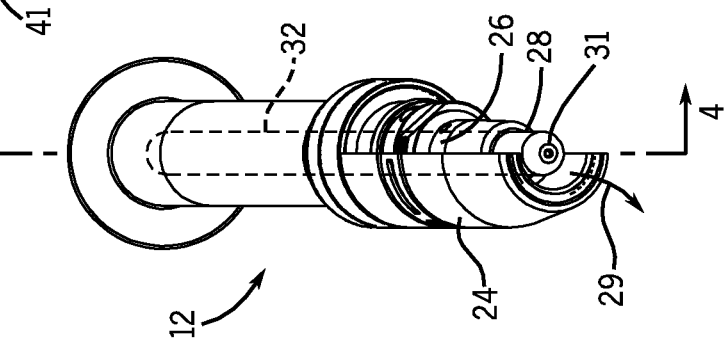
FIG. 4
FIG. 3

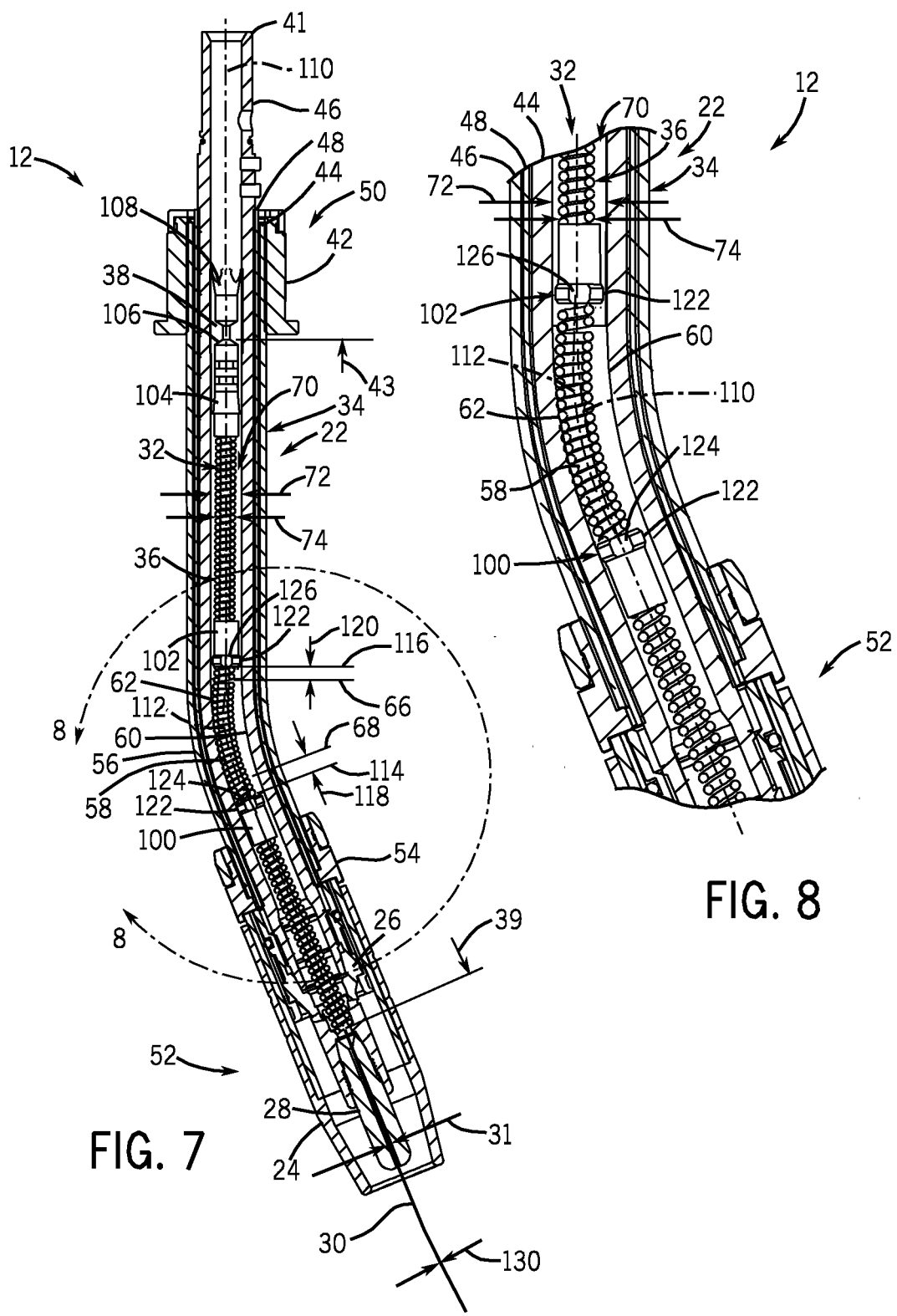

WELDING SYSTEM AND METHOD HAVING CONTROLLED LINER CONTOUR AND WELDING WIRE CURVATURE

CROSS REFERENCE TO RELATED APPLICATIONS

This application claims priority to U.S. Provisional Patent Application No. 60/945,888, entitled "WELDING SYSTEM AND METHOD USING HIGH FREQUENCY/LOW ENERGY GOOSENECK ASSEMBLY", filed on Jun. 22, 2007, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The invention relates generally to welding systems and, more particularly, to torches having a wire fed to a contact tip.

Existing welding torches, such as metal inert gas (MIG) torches, pass a welding wire and a shielding gas through a neck (e.g., a gooseneck) to a torch head having a nozzle, diffuser, and contact tip. At the torch head, the contact tip transfers energy (e.g., current) to the welding wire, and an arc forms between the welding wire and a work piece. The arc then melts the welding wire to form a weld on the work piece. In addition, the shielding gas protects the arc and the weld during the process, for example, to avoid oxidation and other problems.

In many welding systems, a wire feeder draws the welding wire from its package and feeds it through a torch. The welding wire, when drawn out of the package, may have various curvatures (e.g., cast and helix), which depends on the manufacturing processes such as cold drawing, heat treatment, coiling, the geometry of the package, and so forth. The curvature can cause the welding wire to bind, jam, or flip within the torch. For example, the welding wire may curve in a helical manner (e.g., like a coil spring) when pulled from the spool. By further example, the welding wire may curve in a sinusoidal manner (e.g., like a snake) when pulled from the spool. In either case, the curvature can cause problems within the torch. Recently, wire manufacturers have produced wire for automatic and robotic applications that maintains a substantially straight geometry when pulled from the package. In other words, the welding wire curves in a sinusoidal manner with a radius of 60 inches or more, rather than a traditional circular case with a radius of 20 to 30 inches. Although this relatively straight geometry reduces some problems with binding, jamming, or flipping within the torch, it also causes problems with inconsistent contact between the contact tip and the welding wire.

At the torch head, the torch transfers energy (e.g., current) from the contact tip to the welding wire. However, the energy transfer can depend largely on the contact between the welding wire and the internal passage through the contact tip. If the welding wire does not adequately contact the internal passage of the contact tip, then more energy is consumed at the interface between the contact tip and the welding wire, and arcing can occur inside the contact tip leading to undesirable arc damage, deposits, and so forth. In turn, the contact tip can prematurely wear out and cease to transfer sufficient energy (e.g., current) to the welding wire, thereby decreasing energy transfer between the welding wire and the work piece. The premature wear can also cause large fluctuations of the welding current and arc stability. If insufficient energy is transferred to the weld location, then the welding wire may not melt to form the weld and/or the weld may not have the desirable characteristics leading to subsequent failure.

In summary, welding wire having a relatively straight geometry when pulled from a package can result in reduced contact between the welding wire and the internal passage of the contact tip. As a result, the welding wire itself can cause premature wear and failure of the contact tip.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A welding system, in certain embodiments, may include a torch having a gooseneck, a jump liner, an insert or spacers, and a contact tip. The gooseneck includes an arcuate portion, and the jump liner is disposed in the gooseneck and extends through the arcuate portion. The jump liner includes a longitudinal compression mechanism, such as a helical coil of metal wire, defining a welding wire pathway. Thus, the jump liner bends through the arcuate portion via the longitudinal compression mechanism. In this manner, the pathway through the longitudinal compression mechanism has a curvature configured to bend a welding wire passing through the pathway. The contour of the jump liner is controlled by its length, the insert or spacers, and the longitudinal compression mechanism. For example, the insert is coupled to the jump liner inside the gooseneck, wherein the insert is configured to at least substantially fix the curvature to force the welding wire to achieve a wire curvature. The contact tip is coupled to the gooseneck via the diffuser, wherein the welding wire curvature is configured to bias the welding wire into substantially consistent contact with an interior pathway through the contact tip.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

DRAWINGS

These and other features, aspects, and advantages of the present invention will become better understood when the following detailed description is read with reference to the accompanying drawings in which like characters represent like parts throughout the drawings, wherein:

FIG. 1 is a perspective view of an embodiment of a robot welding system having a welding torch coupled to a robotic arm;

FIG. 2 is a partial side perspective view of an embodiment of the welding torch within curved line 2-2 of FIG. 1;

FIG. 3 is a partial front perspective view of an embodiment of the welding torch as illustrated in FIGS. 1-2;

FIG. 4 is a cross-sectional view of an embodiment of the welding torch taken along line 4-4 of FIG. 3, illustrating features of a jump liner assembly within a gooseneck of the welding torch;

FIG. 7 is a cross-sectional view of another embodiment of the welding torch taken along line 4-4 of FIG. 3, illustrating features of an alternative jump liner assembly within the gooseneck of the welding torch;

FIG. 8 is a partial cross-sectional view of the welding torch as illustrated in FIG. 7, illustrating bending of the jump liner assembly through an arcuate portion of the gooseneck;

DETAILED DESCRIPTION

Figure 5:
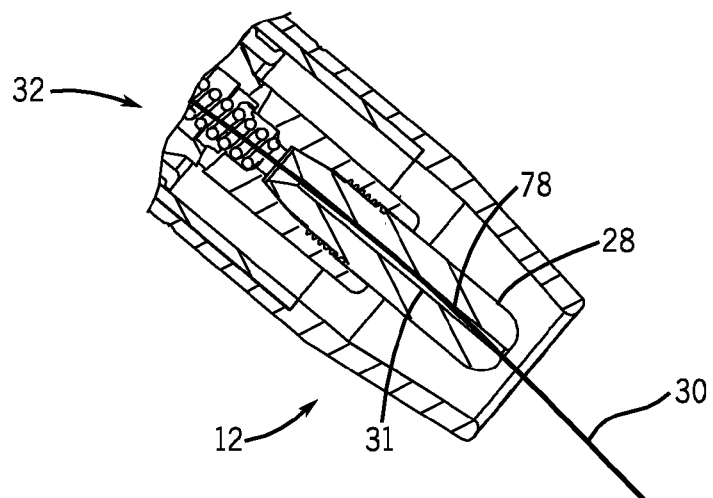
FIG. 5 is a partial cross-sectional view of an embodiment of the welding torch within curved line 5-5 of FIG. 4, further illustrating contact between a welding wire and a contact tip attributed at least partially due to bending imparted by the jump liner assembly into the welding wire.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In various embodiments of a torch, a novel gooseneck assembly is provided to address the need to improve the consistency of the contact between a contact tip and a welding wire, thereby increasing the longevity of the contact tip service life. This gooseneck assembly can be fit into any robotic assembly, such as those made by Tregaskiss of Windsor, Ontario, Canada. As discussed below, embodiments of a gooseneck are provided to create consistent welding wire curvature of the welding wire as it passes through the gooseneck and into the contact tip. Current results have shown that this design significantly improves the contact between the contact tip and the welding wire. For example, the gooseneck assembly may include a coaxial arrangement of a copper tube, an insulator, and an aluminum outer jacket, wherein the coaxial arrangement includes an arcuate portion upstream of the contact tip. The disclosed embodiments also include a unique design of a jump liner assembly comprising a jump liner (e.g., a longitudinal compress mechanism) and one or more jump liner spacers or gooseneck inserts. The jump liner assembly is configured to fit within the gooseneck to pass the welding wire to the contact tip, while controlling the curvature imparted onto the welding wire. In this manner, the jump liner assembly improves the contact between the contact tip and the welding wire.

Specifically, in the embodiments discussed in detail below, the longitudinal compress mechanism may include a flexible or resilient sleeve (e.g., a coil spring) configured to fit various bends or contours of goosenecks. For example, an embodiment of the jump liner is inserted and secured at both ends inside the gooseneck. The longitudinal compress mechanism (e.g., coil spring) of the jump liner is longer than the length along the centerline of the gooseneck, such that the jump liner is compressed longitudinally and forced to bend in a desired curvature when assembled within the gooseneck. The spacers or gooseneck inserts are configured to adjust placement of the longitudinal compress within the gooseneck, thereby controlling the curvature imparted onto the welding wire. For example, the spacers or gooseneck inserts may be used to change the position of the longitudinal compress leading into and/or exiting a bend in the gooseneck, thereby changing the radius of curvature of the longitudinal compress relative to the bend in the gooseneck. By further example, in some embodiments, one or two spacers are permanently attached to the jump liner to accurately control the curvature radius and location. In other embodiments, the spacers can be replaced with a gooseneck insert that permanently attaches inside the gooseneck rather than attaching directly to the jump liner. In this manner, the spacers or gooseneck inserts may be used to set a specific bend radius and angle location within the gooseneck. As a result, the longitudinal compress, spacers, and/or gooseneck inserts can control the curvature (i.e., lesser or greater radius) imparted onto the welding wire, which in turn controls the contact between the welding wire and the contact tip.

FIG. 1 is a perspective view of an embodiment of a robot welding system 10 having a welding torch 12 coupled to a robotic arm 14. As appreciated, the welding torch 12 may be a metal inert gas (MIG) torch or another wire feed torch. In addition, the robotic arm 14 may be coupled to a control system, such as an automated control system for an assembly line. The illustrated system 10 also includes a supply cable 16 coupled to the torch 12. The supply cable 16 may collectively carry a welding current from a welding power supply, a welding wire from a wire package (e.g., spool) coupled to a wire feeder, a shielding gas from a supply tank (e.g., cylinder), and so forth. The supply cable 16 also may carry control signals to the welding torch 12. As discussed further below, the welding torch 12 has a unique assembly configured to bend a welding wire in a controlled manner to provide consistent contact and energy transfer within the welding torch 12.

FIG. 2 is a partial side perspective view of an embodiment of the welding torch 12 as illustrated in FIG. 1. FIG. 3 is a partial front perspective view of an embodiment of the welding torch 12 as illustrated in FIGS. 1-2. Several features of the welding torch 12 are now discussed with reference to FIGS. 2-3. As illustrated in FIG. 2, the torch 12 is coupled to the robotic arm 14 via a torch mount 18 and a mounting arm 20. The illustrated torch 12 includes an arcuate neck 22, such as a gooseneck. In certain embodiments, the neck 22 has a bend angle between about 20 to 45 degrees and a bend radius between about 2 to 4 inches. However, the particular bend angle and radius may vary depending on the dimensions and geometrical relationships of the torch components, the wire size and characteristics, and so forth. As discussed further below, the curvature used to bend the welding wire 30 inside the neck 22 is controlled by virtue of a unique jump liner assembly 32 disposed inside the neck 22.

As illustrated in FIGS. 2-3, the torch 12 includes a nozzle 24, a gas diffuser 26 disposed coaxially within the nozzle 24, and a contact tip 28 disposed coaxially within the nozzle 24. In FIGS. 2-3, a portion of the nozzle 24 is cutaway to better illustrate the gas diffuser 26 and the contact tip 28. A shielding gas 29, a welding wire 30, and an electrical current (e.g., a welding current) pass through these components of the torch 12 to facilitate welding. Specifically, the welding wire 30 passes through the torch 12 and out through the contact tip 28 to create an arc, and thus a weld, with a work piece adjacent the front end or tip of the torch 12. The shielding gas 29 also passes through the torch 12 and out through the nozzle 24 to shield the arc and the weld adjacent the tip of the torch 12.

As illustrated in FIG. 3, the contact tip 28 includes an internal passage 31 configured to deliver the welding wire 30 to the work piece, while also making contact with the welding wire 30 to transfer the electrical current (e.g., welding current) for making the welding arc. Again, as discussed below, the welding wire 30 consistently contacts the internal passage 31 of the contact tip 28 at least substantially due to bending forced on the welding wire 30 as it passes through the jump liner assembly 32 within the neck 22. In certain embodiments, the jump liner assembly 32 may alter (e.g., supplement or correct) any pre-existing but inadequate curvature of the welding wire 30 in a controlled manner to ensure consistent contact between the welding wire 30 and the internal passage 31 of the contact tip 28. The bending imparted into the welding wire 30 ensures that the wire 30 retains a proper curvature while being fed through the contact tip 28, such that the wire 30 is biased against the internal passage 31 of the contact tip 28. Again, the contact tip 28 transfers energy in the form of electrical current (e.g., welding current) to the welding wire 30, which then melts in a plasma arc or by short circuit with material of a work piece. The controlled bending imparted by the jump liner assembly 32 into the welding wire 30 helps to reduce the possibility of undesirable fluctuations in the contact, or instantaneous loss of contact, between the welding wire 30 and the internal passage 31 of the contact tip 28. Thus, the controlled bending also reduces the possibility for undesirable arcing between the contact tip 28 and the welding wire 30. Furthermore, the controlled bending helps reduce variations in contact caused by inconsistencies (e.g., different curvatures) between welding wire 30 from different manufacturers, packages, batches, and so forth.

FIG. 4 is a cross-sectional view of an embodiment of the welding torch 12 taken along line 4-4 of FIG. 3. As illustrated in FIG. 4, the torch 12 includes the jump liner assembly 32 disposed within a body 34 of the neck 22. As discussed in further detail below, the jump liner assembly 32 includes a jump liner 36 (e.g., a longitudinal compress mechanism) having a liner seat 38, and a gooseneck insert 40 disposed concentrically about the jump liner 36 within the body 34 of the neck 22. The illustrated jump liner 36 (e.g., longitudinal compress mechanism) includes a resilient wire conduit or liner having a hollow cylindrical shape configured to pass the welding wire 30. In certain embodiments, the jump liner 36 includes a coil of wire defining a passage for the welding wire 30. For example, the jump liner 36 may comprise a helical or spring-like coil of a music wire. Thus, the jump liner 36 can move, shift, or change curvature within the neck 22 as the welding wire 30 passes toward the contact tip 28. The illustrated gooseneck insert 40 is a rigid insert in a coaxial or concentric arrangement about the jump liner 36 inside the body 34. Advantageously, the gooseneck insert 40 fixes the position and radius of the jump liner 36 in close proximity to an arcuate portion of the neck 22 as discussed in further detail below. In this manner, the gooseneck insert 40 controls the curvature of the jump liner 36 and the welding wire 30 passing through the jump liner 36. As a result, the jump liner 36 and gooseneck insert 40 force the welding wire 30 to bend at a specific location and radius, thereby imparting curvature or forcing the wire 30 to acquire cast prior to reaching the contact tip 28.

In the illustrated embodiment, the jump liner assembly 32 is compressed when assembled within the torch 12. In other words, the jump liner assembly 32 is longer than the space it occupies within the gooseneck 22. The longitudinal compress mechanism (e.g., coil spring) of the jump liner 36 may be selected with a desired amount of compressibility, e.g., less than 5 millimeters, lengthwise along the neck 22. For example, the compressibility may range between 2 to 4 millimeters. Thus, in certain embodiments, the length of the jump liner assembly 32 is longer (e.g., 2 to 4 mm longer) than the length of the gooseneck center line, from a front stop point 39 to a gooseneck rear end 41, in the case that the jump liner 36 (e.g., wire coil) is permanently coupled with the liner seat 38. In other embodiments, the length of the jump liner assembly 32 is longer (e.g., 2 to 4 mm longer) than the length of the gooseneck center line, from the front stop point 39 to a rear stop point 43 in the case of a quick load liner adaptor. When assembled, the longitudinal compress mechanism (e.g., wire coil) is compressed longitudinally by the diffuser 26 (at front stop point 39) and the body of torch 12 (at gooseneck rear end 41). Due to the spring flexibility, the longitudinal compress mechanism (e.g., wire coil) deflects, so the jump liner 36 centerline deflects away from the gooseneck center line. In this manner, the jump liner assembly 32 creates a desired curvature for the passage and bending of the welding wire 30.

The illustrated neck body 34 is coupled to a main torch body or mount 42, which connects with the mounting arm 20 through a torch housing. As illustrated in FIG. 4, the neck body 22 is located coaxially between the mount 42 and the jump liner assembly 32. Specifically, the neck body 34 includes an outer jacket 44, a conductive portion 46, and insulation 48 disposed coaxially between the outer jacket 44 and the conductive portion 46. The jump liner assembly 32 fits within the conductive portion 46. The liner seat 38 is coupled to the jump liner 36 at an upstream end portion 50 in the vicinity of the mount 42, while the gooseneck insert 40 is disposed concentrically about the jump liner 36 at a downstream end portion or head 52 of the torch 12. The illustrated torch 12 further includes a nozzle insulator 54 disposed at the head 52 of the torch 12. As discussed in detail below, the jump liner assembly 32 is configured to provide a controlled bending of the welding wire 30 as it passes through the neck 22 to the contact tip 28, thereby ensuring consistent contact and energy transfer between the welding wire 30 and the internal passage 31 of the contact tip 28.

The components of the torch 12 may be made of a variety of materials. In certain embodiments, the mount 42 is made of aluminum, the outer jacket 44 is made of aluminum, the conductive portion 46 is made of copper, and the insulation 48 is made of a fiber glass epoxy composite. As appreciated, the nozzle insulator 54 is configured to electrically and/or thermally isolate the neck 22 from the nozzle 24 and adjacent components. Thus, certain embodiments of the nozzle insulator 54 are made of Teflon and aluminum. Turning now to the jump liner assembly 32, certain embodiments of the jump liner 36 include a length of material coiled in a helical manner to define a resilient tubular structure to feed the welding wire 30 to the contact tip 28. For example, as mentioned above, the jump liner 36 may be made of high carbon steel, such as music wire or other metals like bronze, which is wound like a coil spring. Embodiments of the gooseneck insert 40 are made of a rigid material, such as a metal (e.g., brass) or a polymer. However, these elements 36 and 40 may be made of a variety of materials. Furthermore, illustrated the liner seat 38 is made of a rigid material, such as a metal (e.g., brass) or a polymer. In the illustrated embodiment, all of these components generally have a cylindrical geometry, and the components are generally coaxial or concentric with one another along a longitudinal axis of the torch 12.

As illustrated in FIG. 4, the jump liner assembly 32 extends through an arcuate portion 56 of the neck body 34, and is configured to vary a liner radius of curvature 58 selectively between an inner neck radius of curvature 60 and an outer neck radius of curvature 62 within the conductive portion 46 of the neck body 34. These radii of curvature 58, 60, and 62 define a curvature or bend along the neck body 34 between the upstream and downstream end portions 50 and 52. Thus, the center of these radii of curvature 58, 60, and 62 are located at some distance outside of the torch 12. Furthermore, the length of these curvatures 58, 60, and 62 is defined by an angle between a beginning point and an end point along the neck 22. For example, the length of the curvatures 60 and 62 is defined by an angle 64 between a beginning point 66 and an end point 68. In certain embodiments, as discussed in detail below, the jump liner assembly 32 can change the radius, length (e.g., angle), beginning point, and/or end point of the curvature 58 to control the amount of bending imparted onto the welding wire 30.

Specifically, in the illustrated embodiment, the intermediate portion of the jump liner 36 is disposed in a space 70 within the conductive portion 46, which has a diameter 72 larger than a diameter 74 of the jump liner 36. Thus, as a result of this space 70, the jump liner 36 can shift radially back and forth between the inner and outer curvatures 60 and 62. In the illustrated embodiment, the gooseneck insert 40 is disposed about the jump liner 36 to center the jump liner 36 in the region between the arcuate portion 56 of the neck body 34 and the downstream end portion 52. As a result, the gooseneck insert 40 changes the curvature 58 of the jump liner 36.

As the jump liner 36 is compressed at both ends 39 and 43, the jump liner 36 is pushed outwardly toward the outer curvature 62 while the gooseneck insert 40 forces the jump liner 36 (and welding wire 30) back toward the center liner. In this manner, the resiliency of the jump liner 36 combined with the repositioning by the gooseneck insert 40 creates a smaller radius of curvature 58. As appreciated, the gooseneck insert 40 can be positioned closer or further away from the end point 68 of the curvatures 60 and 62 within the conductive portion 46 of the neck body 34, thereby decreasing or increasing the radius of curvature 58. For example, if the gooseneck insert 40 is positioned closer to the end point 68, then the gooseneck insert 40 can effectively decrease the radius of curvature 58 of the jump liner 36 to impart a greater amount of bending into the welding wire 30. Alternatively, if the gooseneck insert 40 is positioned further away from the end point 68, then the gooseneck insert 40 can effectively increase the radius of curvature 58 of the jump liner 36 to impart a lesser amount of bending into the welding wire 30. In one embodiment, the gooseneck insert 40 is positioned at about 0 to 12 millimeters away from the end point 68 (i.e., toward the contact tip 28). Without the gooseneck insert 40, the jump liner 36 may shift outwardly toward the outer curvature 62 in response to the force of the welding wire 30 passing through the jump liner 36, such that the curvatures 58 and 62 are substantially the same as one another. Thus, with the combined advantages of both the jump liner 36 and the gooseneck insert 40, the jump liner assembly 32 can control the radius of curvature 58 of the jump liner 36 to control the bending of the welding wire 30.

In various embodiments, the jump liner assembly 32 may include a single pre-assembled structure that collectively fits within the neck 22, or the jump liner assembly 32 may include separate components that fit inside the neck 22. For example, in the illustrated embodiment, the gooseneck insert 40 is separate from the jump liner 36 and the liner seat 38. In addition, the jump liner 36 is either permanently coupled with the liner seat 38, or alternatively, the jump liner 36 is removably coupled to the liner seat 38 with a quick load liner mechanism. If the jump liner 36 is pre-assembled with the liner seat 38, then the jump liner 36 is installed into the neck 22 from the upstream end portion 50, while the gooseneck insert 40 is installed form the downstream end portion 52. If the liner seat 38 is separate from the jump liner 36, then the jump liner 36 and the gooseneck insert 40 are installed individually or together from the downstream end portion 52, while the liner seat 38 is installed from the upstream end portion 50. However, a variety of installation techniques may be used for the jump liner assembly 32. In certain embodiments, the liner seat 38 and/or the gooseneck insert 40 is either permanently fixed inside the neck 22, or these components can be removed from the neck 22. For example, the liner seat 38 and/or the gooseneck insert 40 can be mounted inside the neck 22, by the methods of press fit, or thread, or bind, or set screw, or solder/braze, and so forth. In the illustrated embodiment, the liner seat 38 and/or the gooseneck insert 40 are press fit tightly within the conductive portion 46, such that each component is secured within the neck 22. In either case, the jump liner assembly 32 is secured longitudinally within the neck 22 when assembled in the torch 12. An innermost end 76 of the gooseneck insert 40 is in close proximity to the arcuate portion 56 of the neck 22 and the curvature 58 of the jump liner 36. Again, the gooseneck insert 40 secures the liner 36 with the desired radius of curvature 58 and position, thereby forcing the welding wire 30 to bend and acquire the desired cast as discussed above. This cast or tendency to bend or curve ensures that the welding wire 30 consistently contacts the internal passage 31 of the contact tip 28.

FIG. 5 is a partial cross-sectional view of an embodiment of the welding torch 12 within curved line 5-5 of FIG. 4, further illustrating contact between the welding wire 30 and the contact tip 28 attributed at least partially due to bending imparted into the welding wire 30 by the welding torch 12. Again, the insert 40 advantageously fixes the position and radius of curvature 58 of the liner 36, thereby forcing the welding wire 30 to bend in a manner ensuring a spring-like contact within the contact tip 28. As illustrated by FIG. 5, the welding wire 30 has a wire curvature 78 (e.g., circular or cup-like geometry) that biases the wire 30 against the internal passage 31 of the contact tip 28. This contact ensures consistent energy transfer (e.g., current) from the contact tip 28 to the welding wire 30 without undesirable arcing between the contact tip 28 and the welding wire 30.

Figure 6:
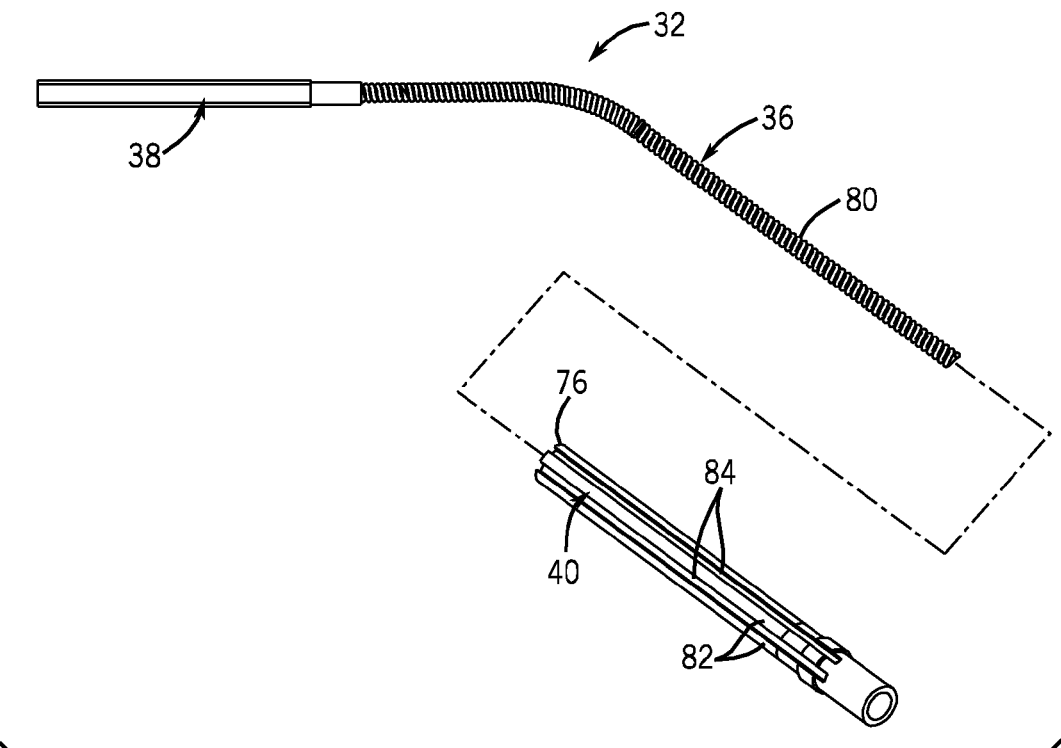
FIG. 6 is an exploded perspective view of the jump liner assembly of FIG. 4, illustrating a gooseneck insert exploded from a longitudinal compress mechanism (e.g., wire coil) of a jump liner.

FIG. 6 is a perspective exploded view of an embodiment of the jump liner assembly 32 illustrating the jump liner 36 with the liner seat 38 coupled together and exploded from the gooseneck insert 40. As illustrated, the jump liner 36 includes a longitudinal compression mechanism 80, which includes a helical coil of wire. Thus, the longitudinal compression mechanism 80 can effectively bend through the arcuate portion 56 of the neck body 34 as discussed above. The illustrated gooseneck insert 40 has a cylindrical geometry with lengthwise ribs 82 and grooves 84 along an exterior. The ribs 82 are configured to press fit into the conductive portion 46, and the grooves 84 are configured to pass a shielding gas through the torch 12 to the diffuser 26. Again, the gooseneck insert 40 is configured to fix a bend location, the curvature radius 58, or both, within the welding torch 12 of FIGS. 1-5.

FIG. 7 is a cross-section of an embodiment of the torch 12 taken along line 4-4 of FIG. 3, illustrating an alternative embodiment of the jump liner assembly 32. In general, the illustrated torch 12 of FIG. 7 has similar components, arrangements, and material compositions as illustrated in the embodiment of FIGS. 3-7. Thus, like elements are shown with like element numbers. However, in the illustrated embodiment of FIG. 7, the jump liner assembly 32 includes the jump liner 36 without the gooseneck insert 40 as discussed above with reference to the embodiment of FIGS. 4-7. Specifically, the illustrated jump liner assembly 32 includes a pair of spacers (e.g., a front spacer 100 and a rear spacer 102), rather than the gooseneck insert 40, disposed concentrically about the jump liner 36. These spacers 100 and 102 are located upstream and downstream (e.g., on opposite sides) of the arcuate portion 56 of the neck 22. Thus, similar to the embodiment of FIGS. 4-7, the spacers 100 and 102 may be positioned closer or further away from the arcuate portion 56 to control the curvature 58 of the jump liner 36, thereby controlling the bending of the welding wire 30 passing through the jump liner 36. The jump liner assembly 32 also includes a quick load liner adapter 104 coupled to the liner seat 38. One end of the liner seat 38 has a female coupling 106 for the quick load liner adaptor 104, and the other end of the liner seat 38 has a female coupling 108 for a body liner in the torch 12. As appreciated, the quick load liner adapter 104 is configured to provide a quick connect and disconnect without the use of tools.

The spacers 100 and 102 and the adaptor 104 are made from rigid materials, such as metals (e.g., brass) or polymers. In the illustrated embodiment, the spacers 100 and 102 and the adaptor 104 are permanently attached to the jump liner 36 (e.g., longitudinal compress mechanism or wire coil) via a crimp, solder/braze, threads, or binding, or another suitable coupling. The liner seat 38, the spacers 100 and 102, and the adaptor 104 are designed to provide sufficient gas passages for the delivering of the shielding gas. Thus, as discussed further below, the exterior of these components 38, 100, and 102 may include flats or channels to enable passage of the shielding gas.

In the illustrated embodiment, the jump liner assembly 32 is compressed when assembled within the torch 12. In other words, the jump liner assembly 32 is longer than the space it occupies within the gooseneck 22. The longitudinal compress mechanism (e.g., coil spring) of the jump liner 36 may be selected with a desired amount of compressibility, e.g., less than 5 millimeters, lengthwise along the neck 22. For example, the compressibility may range between 2 to 4 millimeters. Thus, in certain embodiments, the length of the jump liner assembly 32 is longer (e.g., 2 to 4 mm longer) than the length of the gooseneck centerline 110, from the front stop point 39 to the rear stop point 43. When assembled, the longitudinal compress mechanism (e.g., wire coil) is compressed longitudinally by the diffuser 26 (at front stop point 39) and the liner seat 38 (at rear stop point 43). Due to the spring flexibility, the longitudinal compress mechanism (e.g., wire coil) deflects, so the jump liner 36 centerline 112 deflects away from the gooseneck centerline 110. In this manner, the jump liner assembly 32 creates a desired curvature for the passage and bending of the welding wire 30.

As discussed above, the spacers 100 and 102 are positioned at suitable locations 114 and 116 adjacent the arcuate portion 56 of the neck 22 to control the curvature of the jump liner 36 and, thus, the bending of the welding wire 30. In the illustrated embodiment, the front spacer 100 is located at a longitudinal distance or gap 118 relative to a downstream point 68 of the arcuate portion 56, while the rear spacer 102 is located at a longitudinal distance or gap 120 relative to an upstream point 66 of the arcuate portion 56. Thus, the spacers 100 and 102 are located away from the arcuate portion 56 at both the downstream and upstream regions. For example, the gap 118 may be about 0 to 12 mm between the front spacer 100 and the arcuate portion 56, that is, between the location 114 and the point 68. By further example, the gap 120 may be about 0 to 18 mm between the rear spacer 102 and the arcuate portion 56, that is, between the location 116 and the point 66.

An outer diameter 122 of the spacers 100 and 102 is slightly smaller (e.g., 0.08 to 0.2 mm smaller) than the inner diameter 72 of the conductive portion 46 of the gooseneck 22, such that that the spacers 100 and 102 can be effectively fit lengthwise along the conductive portion 46. In addition, as discussed below, the outer diameter 122 of the spacers 100 and 102 also includes flats 124 and 126 to enable passage of the shielding gas. In addition, the inner diameter 72 of the conductive portion 46 of the gooseneck 22 is about 40 to 80 percent larger than the outer diameter 74 of the jump liner 36 (e.g., coil spring), thereby defining the annular space 70 as discussed above. As the jump liner 36 (e.g., wire coil) deflects back and forth within the conductive portion 46 of the neck 22, the deflection is restricted between the two spacers 100 and 102. The desired curvature of the jump liner 36 (e.g., wire coil) can be changed by adjusting the locations 114 and 116 of the spacers 100 and 102 relative to the arcuate portion 56 (e.g., points 66 and 68). The final welding wire 30 curvature is determined by the curvature of the jump liner 36 (e.g., wire coil), an inner diameter 128 (schematically shown in FIG. 8) of the jump liner 36 (see FIG. 8), and the properties of the welding wire 30 (e.g., modulus of elasticity, area, moment of inertia, and so forth).

FIG. 8 is a partial cross-sectional view of the welding torch 12 as illustrated in FIG. 7, illustrating bending of the jump liner assembly 32 through the arcuate portion 56 of the gooseneck 22. Specifically, FIG. 8 better illustrates curvature control provided by the spacers 100 and 102 in cooperation with the jump liner 36 (e.g., wire coil) in the vicinity of the arcuate portion 56. As mentioned above, the illustrated jump liner 36 bends radially outward toward the outer curvature 62 of the conductive portion 46 of the neck 22, while the spacers 100 and 102 generally center the jump liner 36 within the conductive portion 46. Thus, as illustrated in FIG. 8, the gooseneck centerline 110 and the jump liner centerline 112 are generally offset from one another through the arcuate portion 56 between the spacers 100 and 102. Specifically, the gooseneck centerline 110 has a larger radius and, thus, broader sweeping curvature than the jump liner centerline 112. As a result, the jump liner centerline 112 forces the welding wire 30 to travel through the inner diameter 128 of the jump liner 36 along a sharper bend to cause a greater amount of bending of the welding wire 30. Again, the jump liner 36 generally shifts radially toward the outer curvature 62 of the conductive portion 46 due to the resiliency of the jump liner 36 (e.g., wire coil), the greater length of the jump liner 36 than the longitudinal space that it is seated within (e.g., between points 39 and 43), and so forth. The spacers 100 and 102 can center the jump liner 36 closer or further away from the arcuate portion 56, thereby effectively controlling the curvature 58 of the jump liner centerline 112.

In the illustrated embodiment of FIGS. 7 and 8, the inner diameter 128 of the jump liner 36 is about 40 to 120 percent larger than the outer diameter 130 of the welding wire 30. The inner diameter of the passage 31 through the contact tip 28 is about 7 to 20 percent larger than the outer diameter 130 of the welding wire 30. A desired curvature of the welding wire 30 helps to ensure the consistent contact between the welding wire 30 and contact tip 28.

Figure 9:
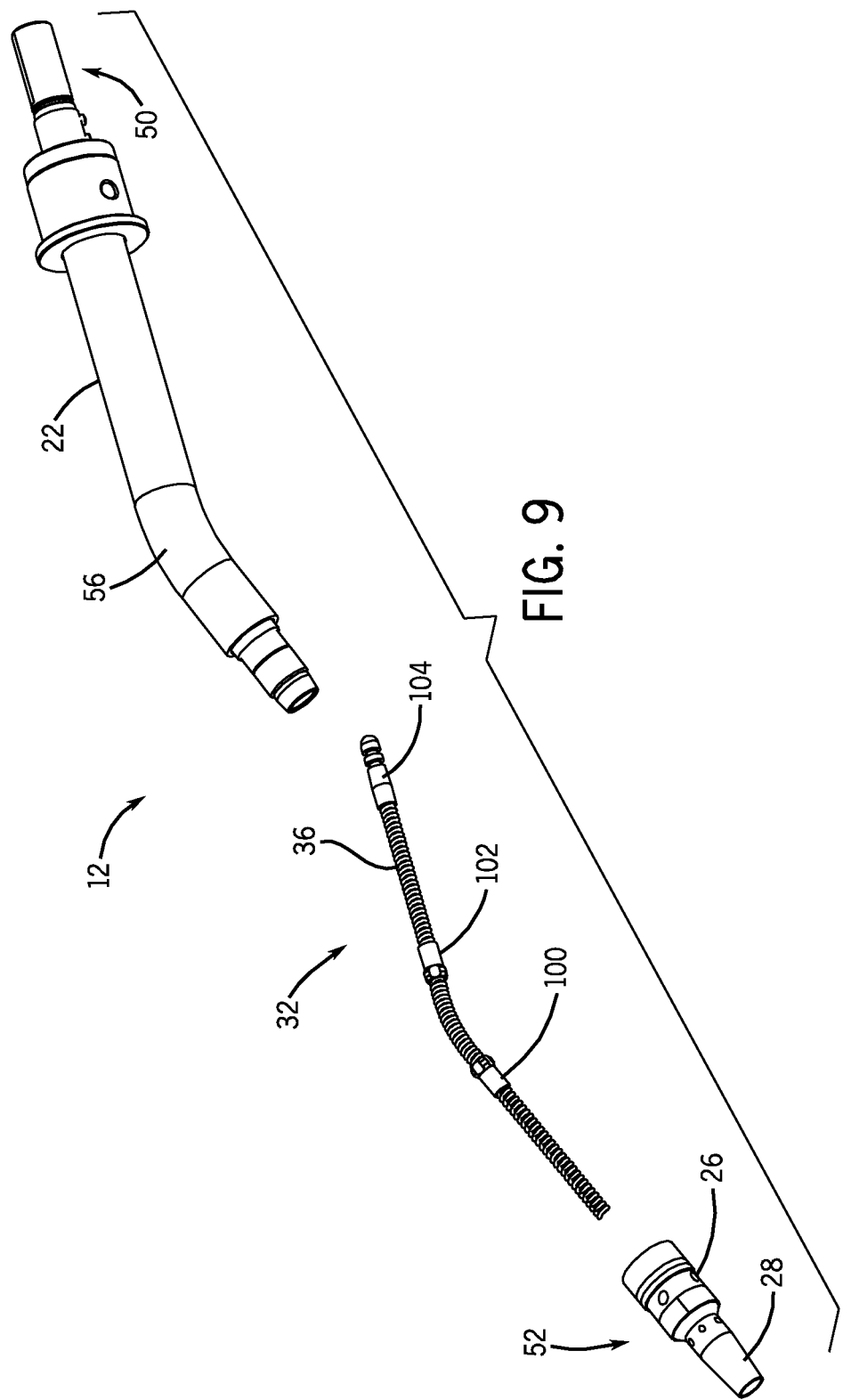
FIG. 9 is an exploded perspective view of the welding torch of FIG. 7, illustrating the jump liner assembly exploded from the gooseneck and a head portion of the welding torch.

FIG. 9 is an exploded perspective view of the welding torch 12 of FIG. 7, illustrating the jump liner assembly 32 exploded from the gooseneck 22 and the downstream end portion or head 52 of the welding torch 12. As illustrated, the spacers 100 and 102 and the adapter 104 are coupled to the jump liner 36, such that the entire assembly 32 can be installed within the neck 22. For example, in the illustrated embodiment, the jump liner assembly 32 can be installed into the neck 22 from the downstream end portion 52 of the neck 22. The jump liner 32 bends through the arcuate portion 56, and the spacers 100 and 102 control the curvature of the jump liner 32 through the arcuate portion 56 to control bending of the welding wire 30. In certain embodiments, one of these spacers 100 or 102 can be removed to leave a single spacer 100 or 102 either upstream or downstream from the arcuate portion 56. Furthermore, the adaptor 104 can also be eliminated from the assembly 32. In various embodiments, the liner seat 38 is either permanently mounted or removably mounted within the gooseneck 22.

Figure 10:
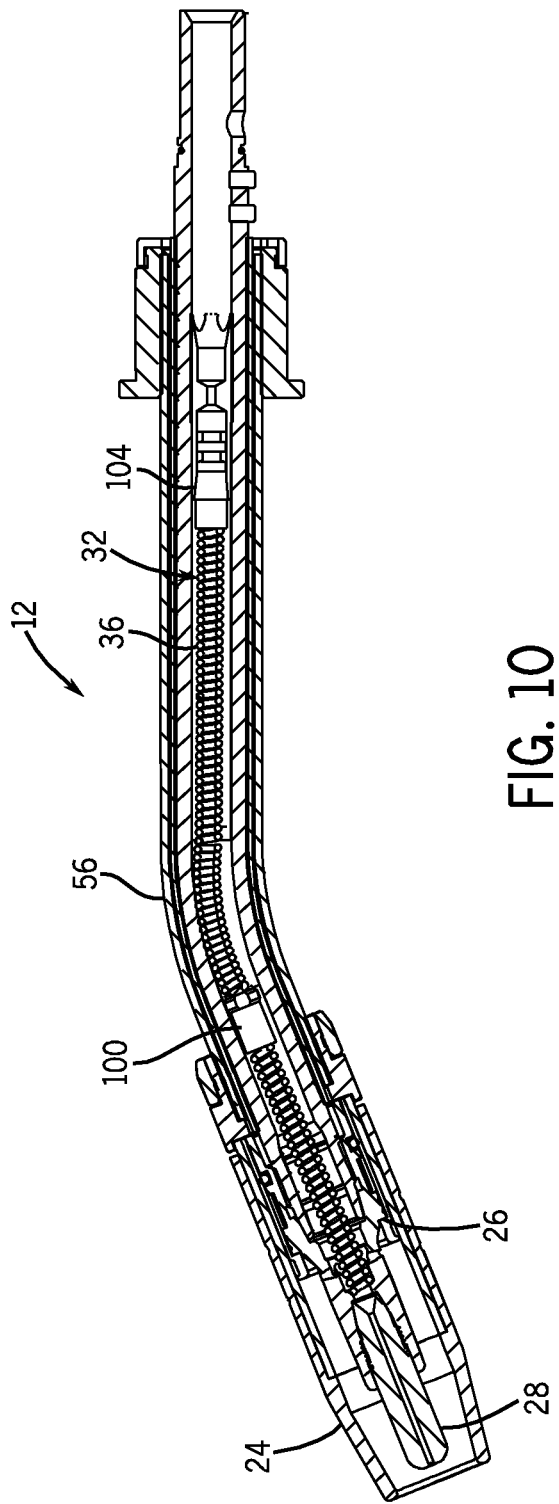
FIG. 10 is a cross-sectional view of another embodiment of the welding torch taken along line 4-4 of FIG. 3, illustrating features of another alternative jump liner assembly within the gooseneck of the welding torch.

FIG. 10 is a cross-sectional view of another embodiment of the welding torch 12 taken along line 4-4 of FIG. 3, illustrating features of another alternative jump liner assembly 32 within the gooseneck 22 of the welding torch 12. In general, the illustrated torch 12 of FIG. 10 has similar components, arrangements, and material compositions as illustrated in the embodiments of FIGS. 3-9. Thus, like elements are shown with like element numbers. Specifically, the illustrated torch 12 of FIG. 10 is similar to the embodiment of FIGS. 8-9, except for the removal of the spacer 102. Thus, in the illustrated embodiment of FIG. 10, the jump liner assembly 32 includes the jump liner 36, the spacer 100, and the adapter 104.

In each of the foregoing embodiments, the jump liner assembly 32 can be a consumable part, which can readily be changed by removing the nozzle 24, diffuser 26, and/or neck 22. Furthermore, the jump liner 32 can be sold as part of an original torch 12, or it can be sold as a retrofit kit for a variety of existing torches 12. As a result, the unique control features attributed to the jump liner 32 can be added to a variety of new and pre-existing torches 12 already on the market and with customers.

In further alternative embodiments, the gooseneck insert 40 and the spacers 100 and 102 are replaced with alternative mechanisms to secure the jump liner 36 at desired positions within the gooseneck 22. Specifically, the alternative mechanisms are configured to secure the jump liner 36 upstream and/or downstream from the arcuate portion 56 of the gooseneck 22, thereby controlling the curvature 58 of the jump liner centerline 112. For example, the alternative mechanisms may include one or more indentations, protrusions, set screws (e.g., spherical-head set screws), or the like, within the conductive portion 46 of the gooseneck 22.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch, comprising:
a mount;
a gooseneck having a neck body coupled to the mount and an arcuate portion downstream of the neck body; and
a jump liner assembly disposed within the gooseneck and extending through the arcuate portion, wherein the jump liner assembly comprises:
a liner coil having a length from a first end to a second end, wherein the first end and the second end are downstream of the mount, and the liner coil extends at least through the arcuate portion between upstream and downstream positions;
a first insert disposed in the gooseneck around the liner coil at the upstream position, wherein the upstream position of the first insert is downstream of the first end of the liner coil; and
a second insert disposed in the gooseneck around the liner coil at the downstream position, wherein the downstream position of the second insert is downstream of the first insert and upstream of the second end of the liner coil, and the first and second inserts are positioned to control a first curvature of the liner coil relative to a second curvature of the arcuate portion.

2. The welding torch of claim 1, wherein the first and second inserts are disposed proximate to the arcuate portion to control the liner coil to an off-axis position relative to a gooseneck centerline at least substantially through the arcuate portion of the gooseneck.

3. The welding torch of claim 1, wherein the first curvature and the second curvature are different from one another, and the first and second inserts are coupled to the liner coil at an offset distance from one another.

4. The welding torch of claim 1, wherein the first and second inserts substantially center the liner coil at the upstream and downstream positions directly adjacent the arcuate portion, and the liner coil is off-axis between the first and second inserts.

5. The welding torch of claim 1, wherein the jump liner assembly controls curvature of a welding wire passing through the arcuate portion of the gooseneck.

6. The welding torch of claim 1, comprising a diffuser coaxially coupled with the gooseneck and a contact tip coaxially coupled with the diffuser, wherein the jump liner assembly controls curvature of a welding wire to control contact between the welding wire and an internal passage through the contact tip.

7. A method, comprising:
forcing a curvature of a welding wire passing through a jump liner assembly in an arcuate portion of a gooseneck of a torch toward a contact tip, wherein the jump liner assembly comprises:
a liner coil having a length from a first end to a second end, wherein the liner coil extends at least through the arcuate portion between upstream and downstream positions;
a first insert disposed in the gooseneck around the liner coil at the upstream position proximate to the arcuate portion, wherein the upstream position of the first insert is offset from both the first end and the second end of the liner coil, and the upstream position of the first insert is entirely within the gooseneck; and
a second insert disposed in the gooseneck around the liner coil at the downstream position proximate to the arcuate portion, wherein the downstream position of the second insert is offset from both the first end and the second end of the liner coil, the downstream position of the second insert is entirely within the gooseneck, and the first and second inserts are positioned to control a first curvature of the liner coil relative to a second curvature of the arcuate portion; and providing substantially consistent contact between the welding wire and the contact tip at least substantially attributed to the curvature.

8. The method of claim 7, wherein forcing the curvature comprises centering the liner coil at the upstream and downstream positions via the first and second inserts, and enabling the liner coil to bend off-center from a gooseneck centerline through the arcuate portion.

9. A welding system, comprising:
  a torch, comprising:
    a mount;
    a neck having a neck body coupled to the mount and an arcuate portion downstream of the neck body;
    a resilient jump liner coil having a length from a first end to a second end, wherein the resilient jump liner coil is disposed in the neck and extends through the arcuate portion, the first end and the second end are downstream of the mount, and the resilient jump liner coil comprises a pathway having a curvature configured to bend a welding wire passing through the pathway;
    at least one insert disposed about the resilient jump liner coil inside the neck proximate to the arcuate portion, wherein the at least one insert is coupled to the resilient jump liner coil at an intermediate portion between the first and second ends, the at least one insert is disposed entirely within the neck, and the at least one insert is configured to at least substantially fix the curvature to force the welding wire to achieve a wire curvature; and
    a contact tip coupled to the neck opposite of the mount, wherein the wire curvature is configured to bias the welding wire into substantially consistent contact with an interior pathway through the contact tip.

10. The welding system of claim 9, wherein the resilient jump liner coil comprises a coil of wire defining the pathway having the curvature.

11. The welding system of claim 9, wherein the at least one insert comprises a first insert disposed downstream of the arcuate portion and upstream from the contact tip, and the first insert is disposed in close proximity to the curvature.

12. The welding system of claim 9, comprising a gas diffuser and nozzle assembly coupled to the neck.

13. The welding system of claim 9, comprising a robotic arm coupled to the torch.

14. The welding torch of claim 1, wherein the first insert is configured to support the liner coil at a first distance upstream from a contact tip of the welding torch, and the second insert is configured to support the liner coil at a second distance upstream from the contact tip of the welding torch.

15. The welding torch of claim 1, wherein the first and second inserts each comprise a cylindrical portion and a non-cylindrical portion.

16. The welding torch of claim 1, wherein the first and second inserts each comprise at least one shielding gas passage.

17. The welding torch of claim 16, wherein the at least one shielding gas passage comprise a plurality of flats along an exterior of each one of the first and second inserts.

18. The welding torch of claim 1, wherein the first insert is disposed at a first offset distance upstream from and proximate to the arcuate portion, the second insert is disposed at a second offset distance downstream from and proximate to the arcuate portion, and the first and second offset distances are selected to control the first curvature of the liner coil relative to the second curvature of the arcuate portion.

19. The welding torch of claim 18, wherein the first and second inserts are movable within the gooseneck to adjust the first and second offset distances.

20. The method of claim 7, wherein the first insert is configured to support the liner coil at a first distance upstream from the contact tip of the torch and directly adjacent to the arcuate portion, and the second insert is configured to support the liner coil at a second distance upstream from the contact tip of the torch and directly adjacent to the arcuate portion.

21. The method of claim 7, wherein the first insert is disposed at a first offset distance upstream from and proximate to the arcuate portion, the second insert is disposed at a second offset distance downstream from and proximate to the arcuate portion, and the first and second offset distances are selected to control the first curvature of the liner coil relative to the second curvature of the arcuate portion.

22. The method of claim 21, wherein the first and second inserts are movable within the gooseneck to adjust the first and second offset distances.

23. The method of claim 21, wherein the first offset distance is between approximately 0 mm to approximately 18 mm, and the second offset distance is between approximately 0 mm to approximately 12 mm.

24. The welding system of claim 9, wherein the at least one insert comprises a first insert and a second insert disposed about the resilient jump liner coil inside the neck proximate to the arcuate portion, the first and second inserts are both offset from the first and second ends, the first insert is disposed downstream of the arcuate portion and upstream from the contact tip, the second insert is disposed upstream of the arcuate portion and upstream from the contact tip, and the first and second inserts are configured to at least substantially fix the curvature to force the welding wire to achieve the wire curvature.

25. The welding system of claim 24, wherein the first insert is disposed at a first offset distance downstream from and proximate to the arcuate portion, the second insert is disposed at a second offset distance upstream from and proximate to the arcuate portion, and the first and second offset distances are selected to control the curvature of the resilient jump liner coil relative to a second curvature of the arcuate portion.

26. The welding system of claim 24, wherein the first and second inserts are movable within the neck to adjust the first and second offset distances.

* * * * *